(12) United States Patent
Miyano et al.

(10) Patent No.: US 7,399,527 B2
(45) Date of Patent: *Jul. 15, 2008

(54) PRESSURE-SENSITIVE ADHESIVE TAPE

(75) Inventors: Akiko Miyano, Ibaraki (JP); Junji Yokoyama, Ibaraki (JP); Yoshikazu Soeda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 93 days.

This patent is subject to a terminal disclaimer.

(21) Appl. No.: 10/623,569

(22) Filed: Jul. 22, 2003

(65) Prior Publication Data

US 2004/0121148 A1   Jun. 24, 2004

(30) Foreign Application Priority Data

Jul. 29, 2002  (JP)  .......................... P. 2002-219567

(51) Int. Cl.
*B32B 7/12* (2006.01)
(52) U.S. Cl. ........................... 428/354; 428/343
(58) Field of Classification Search ................ 428/1.1, 428/343, 353, 542, 543, 354
See application file for complete search history.

(56) References Cited

U.S. PATENT DOCUMENTS

| | | | | |
|---|---|---|---|---|
| 4,285,029 A | * | 8/1981 | McCoy | 362/84 |
| 4,307,729 A | * | 12/1981 | Hart et al. | 600/540 |
| 4,906,421 A | | 3/1990 | Plamthottam et al. | |
| 4,950,537 A | | 8/1990 | Vesley et al. | |
| 5,100,728 A | | 3/1992 | Plamthottam et al. | |
| 5,468,532 A | * | 11/1995 | Ho et al. | 428/40.9 |
| 5,643,676 A | * | 7/1997 | Dobashi et al. | 428/411.1 |
| 6,014,196 A | * | 1/2000 | Anzaki et al. | 349/137 |
| 6,166,799 A | * | 12/2000 | Kameyama et al. | 349/185 |
| 6,180,228 B1 | * | 1/2001 | Mueller et al. | 428/354 |
| 2003/0089516 A1 | | 5/2003 | Hattori et al. | |
| 2004/0028895 A1 | * | 2/2004 | Yamakami et al. | 428/354 |
| 2004/0121148 A1 | | 6/2004 | Miyano et al. | |

FOREIGN PATENT DOCUMENTS

| | | |
|---|---|---|
| EP | 0 277 426 A1 | 8/1988 |
| EP | 0 763 584 A1 | 3/1997 |
| EP | 1 386 950 A1 | 2/2004 |
| JP | 11-149254 | 6/1999 |
| JP | 2002-23663 A | 2/2002 |
| JP | 2002-55333 | 2/2002 |
| JP | 2002-235053 A | 8/2002 |
| JP | 2002-249741 A | 9/2002 |
| JP | 2004-156015 A | 6/2004 |

(Continued)

OTHER PUBLICATIONS

European Search Report dated Oct. 2, 2003.

(Continued)

*Primary Examiner*—Terrel Morris
*Assistant Examiner*—Anish Desai
(74) *Attorney, Agent, or Firm*—Sughrue Mion, PLLC

(57) ABSTRACT

A pressure-sensitive adhesive tape contains a substrate and a pressure-sensitive adhesive layer disposed on at least one side of the substrate, wherein the substrate contains colored layers containing a white layer, a layer of a color other than white and black, and a black layer which are superposed in this order.

11 Claims, 3 Drawing Sheets

FOREIGN PATENT DOCUMENTS

| | | |
|---|---|---|
| JP | 2004-161955 A | 6/2004 |
| JP | 2004-184443 A | 7/2004 |
| WO | WO 89/00106 A1 | 1/1989 |
| WO | WO 02/066570 A1 | 8/2002 |
| WO | WO 2004/028797 A1 | 4/2004 |
| WO | WO 2005/019367 A1 | 3/2005 |

OTHER PUBLICATIONS

European Search Report dated Apr. 20, 2005.

Masaru Ibonai, Nenchakuzai-katsuyo Note (Note for putting pressure-sensitive adhesives to practical use), Kogyo Cyosakai Publishing, Inc., Jun. 20, 1991, Second Issue, pp. 8-12.

* cited by examiner

PRESSURE-SENSITIVE ADHESIVE TAPE

FIELD OF THE INVENTION

The present invention relates to a pressure-sensitive adhesive tape. The pressure-sensitive adhesive tape of the invention functions to reflect light and shut off light rays having specific wavelengths. It is useful as a pressure-sensitive adhesive tape for fixing a liquid-crystal display module unit to a backlight unit in fabricating, for example, a liquid-crystal display (LCD) of the internal/external dual lighting type which is suitable for use in applications such as cell phones and PDAs.

BACKGROUND OF THE INVENTION

LCDs of the internal/external dual lighting type which are employed in cell phones and the like include a liquid-crystal display module unit and a backlight unit which are fixed to each other with a pressure-sensitive adhesive tape as shown in FIG. 6. This pressure-sensitive adhesive tape is required to have the property of reflecting light and the property of shutting off light having specific wavelengths. Light-reflecting properties are necessary for reflecting the light from the backlight to thereby enhance luminance and reduce the power consumption based on the effective utilization of reflected light. On the other hand, light-shutting properties are necessary for inhibiting the light from the backlight from leaking out to the LCD surface to cause viewing failures.

Pressure-sensitive adhesive tapes which reconcile light-reflecting properties and light-shutting properties have hitherto been investigated. Pressure-sensitive adhesive tapes of this kind generally have a colored layer disposed on one side of the substrate film or have a colored pressure-sensitive adhesive layer. In general, a white layer is disposed on the backlight side in order to reflect the light from the backlight, and a black layer is disposed on the liquid-crystal display module side in order to prevent the light from leaking out to the LCD surface. For example, a pressure-sensitive adhesive tape employing a substrate film colored white has a transparent pressure-sensitive adhesive layer disposed on the backlight side and has a black layer or black pressure-sensitive adhesive layer disposed on the liquid-crystal display module side. A pressure-sensitive adhesive tape employing a substrate film colored black has a white layer or white pressure-sensitive adhesive layer disposed on the backlight side and has a transparent pressure-sensitive adhesive layer on the liquid-crystal display module side. Furthermore, a pressure-sensitive adhesive tape employing a transparent substrate film has a white layer or white pressure-sensitive adhesive layer disposed on the backlight side and has a black layer or black pressure-sensitive adhesive layer disposed on the liquid-crystal display module side.

However, in order to reconcile light-reflecting properties and light-shutting properties with such a pressure-sensitive adhesive tape, it is necessary to superpose many colored layers or to form colored layers thickly. This has resulted in a problem that the pressure-sensitive adhesive tape comes to have an increased total thickness and be unable to conform to thickness and weight reduction in cell phones and the like.

SUMMARY OF THE INVENTION

An object of the invention is to provide a pressure-sensitive adhesive tape which is usable for fixing a liquid-crystal display module unit to a backlight unit in fabricating an LCD, and which can function to reflect light and shut off light even when it has a thickness capable of conforming to thickness and weight reduction.

Another object of the invention is to provide a liquid-crystal display which includes a liquid-crystal display module unit and a backlight unit fixed thereto with the pressure-sensitive adhesive tape. Still another object of the invention is to provide a pressure-sensitive adhesive tape substrate for use in the pressure-sensitive adhesive tape.

The present inventors made intensive investigations in order to overcome the problem. As a result, they have found that those objects can be accomplished with the pressure-sensitive adhesive tape described below. The invention has thus been achieved.

The invention relates to a pressure-sensitive adhesive tape which comprises a substrate and a pressure-sensitive adhesive layer disposed on at least one side of the substrate,
wherein the substrate comprises colored layers comprising a white layer, a layer of a color other than white and black, and a black layer which are superposed in this order.

In the pressure-sensitive adhesive tape of the invention, a layer of a color other than white and black has been disposed between a white layer and a black layer. Due to this layer arrangement, the absorption by the black layer of the light which has passed through the white layer can be lessened and, hence, the reflectance on the white layer is improved. As a result, when this pressure-sensitive adhesive tape is used for fixing a liquid-crystal display module unit to a backlight unit in fabricating an LCD of the internal/external dual lighting type, then a heightened luminance can be attained. In addition, since there is no need of superposing many colored layers or forming colored layers thickly, the pressure-sensitive adhesive tape can have a reduced total thickness and conform to thickness and weight reduction. On the other hand, since the black layer has light-shutting properties, the light from the backlight can be inhibited from leaking out to the LCD surface to cause viewing failures.

In a preferred embodiment of the pressure-sensitive adhesive tape, the substrate comprises a supporting substrate and colored layers, wherein the colored layers are a white layer, a layer of a color other than white and black, and a black layer which are superposed in this order from the supporting substrate side. In this pressure-sensitive adhesive tape, the supporting substrate preferably is a transparent substrate film. A white substrate film also is preferred as the supporting substrate in this pressure-sensitive adhesive tape.

In another preferred embodiment of the pressure-sensitive adhesive tape, the substrate comprises a supporting substrate and colored layers, wherein the supporting substrate is a white substrate film and the colored layers are a layer of a color other than white and black and a black layer which are superposed in this order from the white substrate film side.

In the pressure-sensitive adhesive tape, the layer of a color other than white and black preferably is a silver layer. Although the color other than white and black is not particularly limited, silver is preferred because the pressure-sensitive adhesive tape containing a silver layer can exhibit light-shutting properties and light-reflecting properties in steps.

The pressure-sensitive adhesive tape is suitable for use in fixing a liquid-crystal display module unit to a backlight unit. This pressure-sensitive adhesive tape for fixing is used in such a manner that the black layer is disposed on the liquid-crystal display module unit side and the white layer is disposed on the backlight unit side.

The invention further relates to a liquid-crystal display including a liquid-crystal display module unit and a backlight unit, wherein the display module unit and the backlight unit being fixed to each other with the pressure-sensitive adhesive tape described above.

The invention furthermore relates to a pressure-sensitive adhesive tape substrate which comprises colored layers comprising a white layer, a layer of a color other than white and black, and a black layer which are superposed in this order, the substrate being for use in the pressure-sensitive adhesive tape described above.

DESCRIPTION OF REFERENCE NUMERALS AND SIGNS

1: substrate
11: colored layers
12: supporting substrate
W: white layer
S: layer of color other than white and black
B: black layer
2: pressure-sensitive adhesive layer

DETAILED DESCRIPTION OF THE INVENTION

Figure 1:
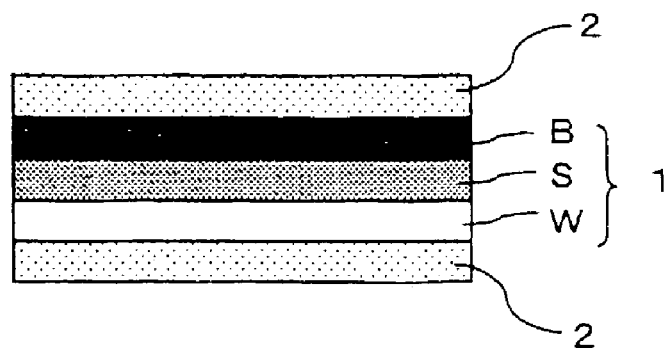
FIG. 1 is a sectional view of one embodiment of the pressure-sensitive adhesive tape according to the invention.

The pressure-sensitive adhesive tape of the invention will be explained below by reference to drawings. The pressure-sensitive adhesive tape of the invention comprises a substrate 1 and a pressure-sensitive adhesive layer 2 disposed on at least one side of the substrate 1. The pressure-sensitive adhesive tape shown in FIG. 1 comprises a substrate 1 and a pressure-sensitive adhesive layer 2 disposed on each side of the substrate 1. The substrate 1 comprises a white layer (hereinafter referred to also as "W layer"), a layer of a color other than white and black (hereinafter referred to also as "S layer"), and a black layer (hereinafter referred to also as "B layer") which are superposed in this order. The pressure-sensitive adhesive tape of the invention can be used in a sheet form.

The colored layers in the invention can be expressed in terms of chromaticity, which can be expressed by the value of L in L·a·b values determined with a colorimeter. The white layer (W layer) is a layer having a chromaticity L, as measured with a calorimeter, in the range of 92±5, while the black layer (B layer) is a layer having a chromaticity L, as measured with a calorimeter, in the range of 25±10.

The pressure-sensitive adhesive tape of the invention is not particularly limited as long as the substrate 1 comprises the W layer, S layer, and B layer in this order. Examples thereof include pressure-sensitive adhesive tapes in which the substrate 1 comprises a supporting substrate 12 and colored layers 11 as shown in FIGS. 2 to 5.

Figure 2:
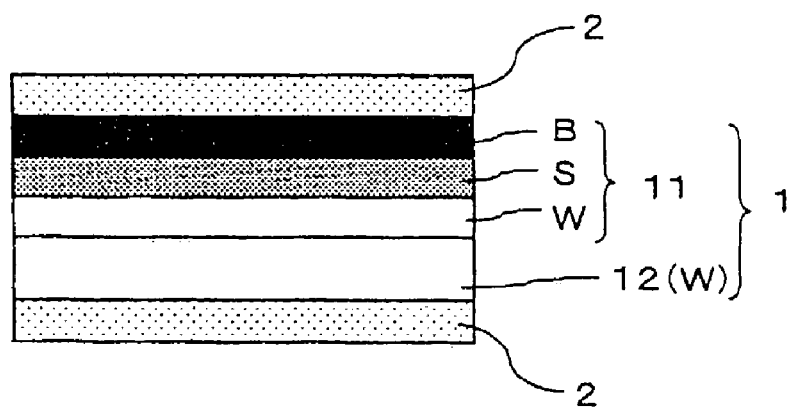
FIG. 2 is a sectional view of another embodiment of the pressure-sensitive adhesive tape according to the invention.
Figure 4:
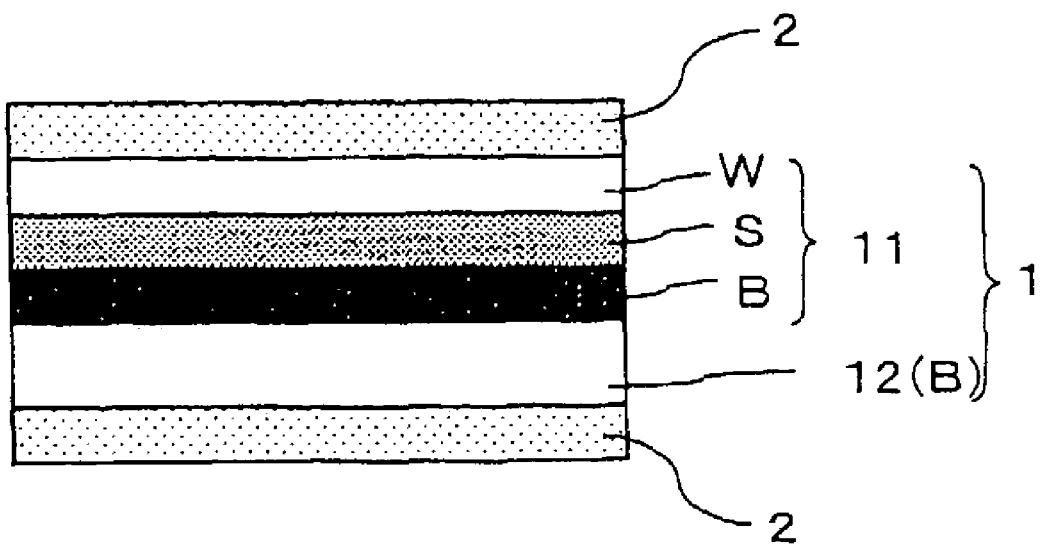
FIG. 4 is a sectional view of a further embodiment of the pressure-sensitive adhesive tape according to the invention.

The pressure-sensitive adhesive tape shown in FIG. 2 includes a 11W layer, a 11S layer, and a 11B layer which have been formed in this order as colored layers 11 from the supporting substrate 12 side. The pressure-sensitive adhesive tape shown in FIG. 4 includes a 11B layer, a 11S layer, and a 11W layer which have been formed in this order as colored layers 11 from the supporting substrate 12 side. In FIGS. 2 and 4, the supporting substrate 12 may be a transparent substrate film. Namely, the substrate 1 may include a transparent layer as long as it comprises a W layer, S layer, and B layer in this order.

In the pressure-sensitive adhesive tape shown in FIG. 2, the supporting substrate 12 can be a white substrate film 12W so that this supporting substrate 12 itself serves as a W layer. In the pressure-sensitive adhesive tape shown in FIG. 4, the supporting substrate 12 can be a black substrate film 12B so that this supporting substrate 12 itself serves as a B layer. Namely, as long as the substrate 1 comprises a W layer, an S layer, and a B layer in this order, the W layer, S layer, and B layer each may consist of a single layer or may be composed of two or more layers.

Figure 3:
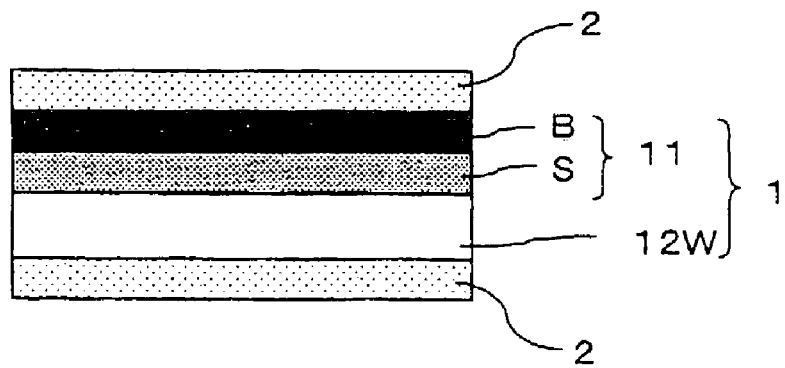
FIG. 3 is a sectional view of still another embodiment of the pressure-sensitive adhesive tape according to the invention.
Figure 5:
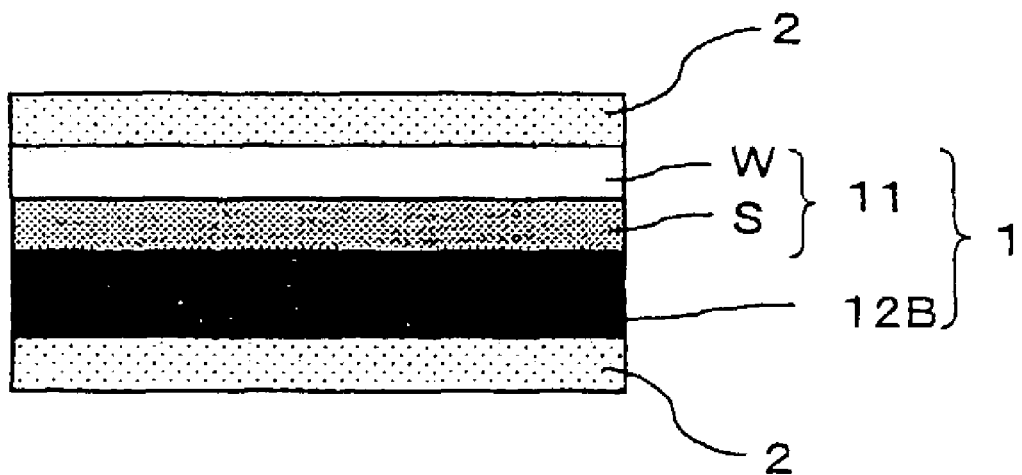
FIG. 5 is a sectional view of still a further embodiment of the pressure-sensitive adhesive tape according to the invention.
Figure 6:
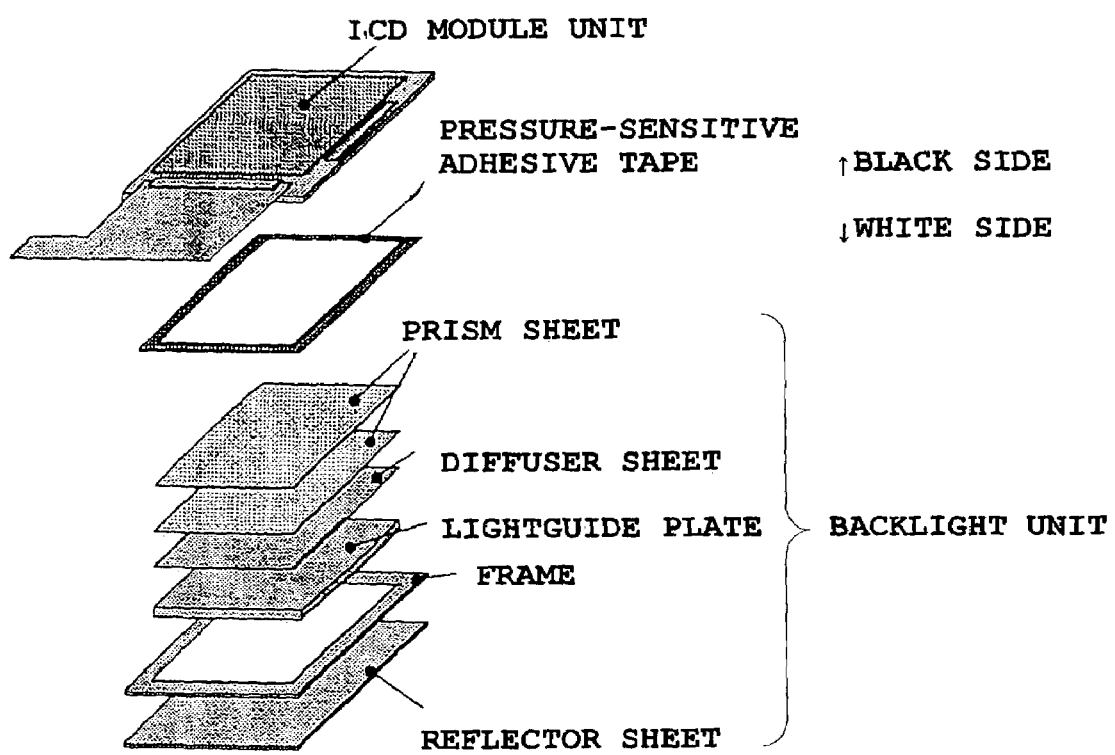
FIG. 6 is a diagrammatic view illustrating the use of a pressure-sensitive adhesive tape for fixing a liquid-crystal display module unit to a backlight unit.

The pressure-sensitive adhesive tape shown in FIG. 3 includes a 11S layer and a 11B layer which have been formed in this order as colored layers 11 from the supporting substrate 12 side. In FIG. 3, the supporting substrate 12 is a white substrate film 12W so that the supporting substrate 12 itself serves as a W layer. The pressure-sensitive adhesive tape shown in FIG. 5 includes a 11S layer and a 11W layer which have been formed in this order as colored layers 11 from the supporting substrate 12 side. In FIG. 5, the supporting substrate 12 is a black substrate film 12B so that the supporting substrate 12 itself serves as a B layer.

In the pressure-sensitive adhesive tape of the invention, the B layer contributes to light-shutting properties, while the W layer contributes to light-reflecting properties. In general, obtaining light-reflecting properties with a W layer is more difficult than obtaining light-shutting properties with a B layer. Because of this, a preferred embodiment of the pressure-sensitive adhesive tape of the invention is the pressure-sensitive adhesive tape shown in FIG. 2 or 3 in which the supporting substrate 12 is a white substrate film 12W.

Examples of other embodiments of the pressure-sensitive adhesive tape of the invention include a pressure-sensitive adhesive tape which includes: a supporting substrate 12 which is a colored film 12S so that the supporting substrate 12 itself serves as an S layer; and a 11B layer and a 11W layer which are disposed as colored layers on one side and the other side, respectively, of the supporting substrate 12. Examples thereof further include a pressure-sensitive adhesive tape including a supporting substrate 12 which itself is composed of a W layer, an S layer, and a B layer which are superposed in this order.

The material of the supporting substrate 12 is not particularly limited, and various kinds of materials can be used. Examples thereof include polyesters such as poly(ethylene terephthalate), poly(butylene terephthalate), and poly (ethylene naphthalate); polyolefins such as polyethylene and polypropylene; poly(vinyl alcohol); and poly(vinylidene chloride). Preferred of these from the standpoints of transparency, strength, etc. are polyesters such as poly(ethylene terephthalate).

The thickness of the supporting substrate 12 is not particularly limited. However, from the standpoints of thickness and weight reduction and processability, the thickness thereof is generally about from 4 to 70 μm, preferably from 10 to 50 μm. In the case where a white substrate film, black substrate film, or the like is to be used as the supporting substrate 12, a pigment or the like is incorporated according to the color.

The colored layers 11 each can be formed by applying a composition comprising a pigment, a binder, and a solvent to the supporting substrate 12. As the binder can be used any of binders for use in colored-layer formation without particular limitations. Examples thereof include polyurethanes, phenolic resins, epoxy resins, urea-melamine resins, and poly (methyl methacrylate). The solvent is suitably selected according to the kinds of the pigment and binder. The pigment is suitably selected according to the color of each of the W layer, S layer, and B layer.

The total thickness of the colored layers 11 is generally preferably about from 1 to 10 µm. The thickness of each colored layer is generally preferably about from 1 to 2 µm. For forming the colored layers, techniques heretofore in use for colored-layer formation, such as, e.g., gravure printing, flexography, or offset printing, can be employed without particular limitations.

Pigments to be used for coloring in forming the supporting substrate 12 and colored layers 11 are a white pigment for the W layer and a black pigment for the B layer. Examples of the white pigment include titanium dioxide, zinc white, and white lead. Examples of the black pigment include carbon black, acetylene black, vegetable black, and graphite.

The color of the S layer is not particularly limited as long as it is neither white nor black. For example, the S layer can be a layer colored silver, blue, or red. Preferred of these colors of the S layer is silver because the silver S layer enables the pressure-sensitive adhesive tape to exhibit light-shutting properties and light-reflecting properties in steps. Examples of silver pigments include aluminum. The S layer preferably is one having a chromaticity L, as measured with a colorimeter, in the range of 70±10.

As the pressure-sensitive adhesive constituting each pressure-sensitive adhesive layer 2 can be used, without particular limitations, any of various pressure-sensitive adhesives including acrylic pressure-sensitive adhesives, rubber-based pressure-sensitive adhesives, and silicone pressure-sensitive adhesives.

Especially preferred examples of the acrylic pressure-sensitive adhesives are ones comprising as the base polymer either a homopolymer of an alkyl (meth)acrylate in which the alkyl group has 1 to 18 carbon atoms or a copolymer of the alkyl (meth)acrylate with one or more other copolymerizable monomers, e.g., functional monomers. The term "(meth)acrylate" as used herein refers to "acrylate and/or methacrylate", and the term "(meth)acrylamide" as used herein refers to "acrylamide and/or methacrylamide".

Examples of the alkyl (meth)acrylate include methyl acrylate, ethyl acrylate, butyl acrylate, isobutyl acrylate, hexyl acrylate, octyl acrylate, 2-ethylhexyl acrylate, isooctyl acrylate, decyl acrylate, isodecyl acrylate, lauryl acrylate, stearyl acrylate, and the alkyl methacrylates corresponding to these acrylates.

Examples of the functional monomers include monomers having one or more hydroxyl groups, monomers having one or more carboxyl groups, and monomers having one or more amide groups. Examples of the monomers having one or more hydroxyl groups include hydroxyalkyl (meth)acrylates such as 2-hydroxyethyl (meth)acrylate and hydroxypropyl (meth)acrylate. Examples of the monomers having one or more carboxyl groups include $\alpha,\beta$-unsaturated carboxylic acids such as acrylic acid, methacrylic acid, and crotonic acid; monoalkyl maleates such as butyl maleate; unsaturated dibasic acids such as maleic acid, fumaric acid, and itaconic acid; and dibasic acid anhydrides such as maleic anhydride.

Examples of the monomers having one or more amide groups include acrylamide, alkyl(meth)acrylamides such as dimethyl(meth)acrylamide and diethyl(meth)acrylamide, N-alkoxymethyl(meth)acrylamides such as N-butoxymethyl (meth)acrylamide and N-ethoxymethyl(meth)acrylamide, and diacetone (meth)acryl-amide. Examples of monomers having one or more amino groups include dimethylaminoethyl (meth)acrylate. Other usable copolymerizable monomers include vinyl acetate, styrene, $\alpha$-methylstyrene, vinyl chloride, acrylonitrile, ethylene, propylene, and the like.

In producing a copolymer of an alkyl (meth)acrylate, it is preferred to copolymerize monomers so that the content of alkyl (meth)acrylate units in the resultant copolymer is 50% by weight or higher based on all monomer units. When the proportion of alkyl (meth)acrylate units is lower than 50% by weight, there is the possibility that the pressure-sensitive adhesive might show insufficient pressure-sensitive adhesive properties. The proportion of alkyl (meth)acrylate units more preferably is 60% by weight or higher.

Besides the base polymer, other ingredients such as, e.g., a tackifier and a crosslinking agent are incorporated into the pressure-sensitive adhesive, e.g., acrylic pressure-sensitive adhesive, according to need. Examples of the tackifier include rosin resins, polyterpene resins, coumarone-indene resins, petroleum resins, and terpene-phenol resins. Examples of the crosslinking agent include isocyanate crosslinking agents, epoxy crosslinking agents, oxazoline crosslinking agents, aziridine crosslinking agents, and metal chelate crosslinking agents.

Examples of the rubber-base pressure-sensitive adhesives include ones comprising as the base polymer a rubbery elastomer such as natural rubber, a styrene/isoprene block copolymer, a styrene/butadiene block copolymer, polyisoprene, polybutene, polyisobutylene, or an ethylene/vinyl acetate copolymer. A tackifier such as, e.g., a rosin resin, polyterpene resin, coumarone-indene resin, petroleum resin, or terpene-phenol resin is incorporated in an appropriate amount into the rubbery elastomer. According to need, a softener such as, e.g., liquid polybutene, mineral oil, liquid polyisoprene, or liquid polyacrylate is further incorporated. As a silicone pressure-sensitive adhesive may be used one comprising polydimethylsiloxane or the like as the main component.

Various additives including an antioxidant, e.g., butylhydroxytoluene, can be added in appropriate amounts to the pressure-sensitive adhesive.

The pressure-sensitive adhesive layer 2 may be formed on one or each side of a substrate 1. Techniques for forming the pressure-sensitive adhesive layer 2 are not particularly limited. Examples of usable techniques include: a method in which a solution or emulsion containing a pressure-sensitive adhesive is directly applied to a substrate 1 with a comma coater, top-feed reverse coater, or the like and dried; and a method in which a pressure-sensitive adhesive layer 2 is separately formed on a release film and this release film having the adhesive layer 2 formed thereon is then applied to a substrate 1.

The thickness of each pressure-sensitive adhesive layer 2 can be determined according to the intended use, etc. In general, it is from 10 to 200 µm. In the case where the pressure-sensitive adhesive tape is to be used as a pressure-sensitive adhesive tape for fixing a liquid-crystal display module unit to a backlight unit in fabricating a liquid-crystal display to be used in a cell phone or the like, the thickness of each pressure-sensitive adhesive layer is preferably from 10 to 50 µm from the standpoint of thickness and weight reduction.

Although each pressure-sensitive adhesive layer 2 usually is transparent, it can be colored white or black. Namely, the pressure-sensitive adhesive layer 2 located on the W layer side of the substrate 1 can be colored white, and the pressure-sensitive adhesive layer 2 located on the B layer side of the substrate 1 can be colored black.

A separator is applied to each pressure-sensitive adhesive layer 2 according to need. Examples of the material constituting the separator include paper and films of synthetic resins such as polyethylene, polypropylene, and poly(ethylene terephthalate). The surface of the separator may have undergone a release treatment such as, e.g., a treatment with a silicone, long-chain alkyl type release agent, or fluorochemical according to need so as to have enhanced releasability from the pressure-sensitive adhesive layer. The thickness of the separator is generally about from 10 to 200 μm, preferably about from 25 to 100 μm.

The invention will be explained below in greater detail by reference to Examples, but the invention should not be construed as being limited by these Examples in any way. Chromaticity measurements were made with calorimeter CR-200, manufactured by Minolta Co., Ltd.

EXAMPLE 1

Three colored layers, i.e., a white layer (chromaticity L: 92), a silver layer (chromaticity L: 75), and a black layer (chromaticity L: 25), were formed in this order by printing on one side of a 38 μm-thick white substrate film (poly(ethylene terephthalate); chromaticity L: 92). This film was used as a substrate. The inks used for printing the colored layers were NB-500, manufactured by Dainichiseika Color & Chemicals Mfg. Co., Ltd. Each colored layer was formed in a thickness of 1 μm. A transparent acrylic pressure-sensitive adhesive was applied to each side of the substrate and dried to form a pressure-sensitive adhesive layer having a thickness of 20 μm. Thus, a double-faced pressure-sensitive adhesive tape was obtained.

EXAMPLE 2

Three colored layers, i.e., a silver layer (chromaticity L: 75), a black layer (chromaticity L: 25), and a black layer (chromaticity L: 25), were formed in this order by printing on one side of a 38 μm-thick white substrate film (poly(ethylene terephthalate); chromaticity L: 92). This film was used as a substrate. The inks used for printing the colored layers were NB-500, manufactured by Dainichiseika Color & Chemicals Mfg. Co., Ltd. Each colored layer was formed in a thickness of 1 μm. A transparent acrylic pressure-sensitive adhesive was applied to each side of the substrate and dried to form a pressure-sensitive adhesive layer having a thickness of 20 μm. Thus, a double-faced pressure-sensitive adhesive tape was obtained.

COMPARATIVE EXAMPLE 1

A black layer (chromaticity L: 25) was formed as a colored layer by printing on one side of a 38 μm-thick white substrate film (poly(ethylene terephthalate); chromaticity L: 92). This film was used as a substrate. The ink used for printing the colored layer was NB-500, manufactured by Dainichiseika Color & Chemicals Mfg. Co., Ltd. The colored layer was formed in a thickness of 1 μm. A transparent acrylic pressure-sensitive adhesive was applied to each side of the substrate and dried to form a pressure-sensitive adhesive layer having a thickness of 20 μm. Thus, a double-faced pressure-sensitive adhesive tape was obtained.

COMPARATIVE EXAMPLE 2

A 38 μm-thick white substrate film (poly(ethylene terephthalate); chromaticity L: 92) was used as a substrate. A transparent acrylic pressure-sensitive adhesive was applied to one side of the substrate and dried to form a pressure-sensitive adhesive layer having a thickness of 20 μm. The other side of the substrate was coated with a black acrylic pressure-sensitive adhesive prepared by incorporating a black pigment into that acrylic pressure-sensitive adhesive, and the coating was dried to form a black pressure-sensitive adhesive layer having a thickness of 20 μm (chromaticity L: 25). Thus, a double-faced pressure-sensitive adhesive tape was obtained.

The double-faced pressure-sensitive adhesive tapes obtained in the Examples and Comparative Examples were tested under the following conditions. In the tests, each pressure-sensitive adhesive tape was illuminated from the white layer side. The results obtained are shown in Table 1.

Transmittance

An integrating sphere type spectral transmittance meter manufactured by Murakami Color Research Laboratory was used to measure the transmittance at a wavelength of 550 nm.

Reflectance

A spectrophotometer manufactured by Shimadzu Corp. was used to measure the diffuse reflectance at a wavelength of 550 nm.

TABLE 1

|  | Example 1 | Example 2 | Comparative Example 1 | Comparative Example 2 |
|---|---|---|---|---|
| Transmittance (%) | 0 | 0 | 0.02 | 0.08 |
| Reflectance (%) | 82 | 78 | 69 | 65 |

The pressure-sensitive adhesive tapes obtained in the Examples were ascertained to have an improved reflectance as compared with the pressure-sensitive adhesive tapes of the Comparative Examples. The pressure-sensitive adhesive tapes of the Examples hence bring about an elevated luminance when used for fixing a liquid-crystal display module unit to a backlight unit in fabricating an LCD of the internal/external dual lighting type. Furthermore, the pressure-sensitive adhesive tapes of the Examples had a transmittance of 0%, i.e., satisfactory light-shutting properties. These pressure-sensitive adhesive tapes hence can inhibit the light from the backlight from leaking out to the LCD surface to cause viewing failures.

While the invention has been described in detail and with reference to specific embodiments thereof, it will be apparent to one skilled in the art that various changes and modifications can be made therein without departing from the spirit and scope thereof.

What is claimed is:

1. A double-sided pressure-sensitive adhesive tape which is for use in fixing a liquid-crystal display module unit to a backlight unit, and which has light-reflective properties and light-shutting properties, said double-sided pressure-sensitive adhesive tape comprising a substrate and a pressure-sensitive adhesive layer disposed as an outermost layer on both sides of the substrate, wherein the substrate comprises colored layers comprising a white layer, a silver layer, and a black layer which are superposed in this order.

2. A double-sided pressure-sensitive adhesive tape substrate which comprises colored layers comprising a white layer, a silver layer, and a black layer which are superposed in this order, the substrate being for use in the double-sided pressure-sensitive adhesive tape of claim 1.

3. The double-sided pressure-sensitive adhesive tape as claimed in claim 1, wherein the substrate further comprises a supporting substrate and wherein the colored layers are a white layer, a silver layer, and a black layer which are superposed in this order from the supporting substrate side.

4. The double-sided pressure-sensitive adhesive tape as claimed in claim 3, wherein the supporting substrate is a transparent substrate film.

5. The double-sided pressure-sensitive adhesive tape as claimed in claim 3, wherein the supporting substrate is a white substrate film.

6. The double-sided pressure-sensitive adhesive tape as claimed in claim 1, wherein the layer of a color other than white and black is a silver layer.

7. The double-sided pressure-sensitive adhesive tape as claimed in claim 1, which is for use in fixing a liquid-crystal display module unit to a backlight unit.

8. A liquid-crystal display comprising a liquid-crystal display module unit and a backlight unit, wherein the display module unit and the backlight unit being fixed to each other with the double-sided pressure-sensitive adhesive tape of claim 1.

9. The double-sided pressure-sensitive adhesive tape as claimed in claim 1, wherein the substrate further comprises a supporting substrate, the supporting substrate is a white substrate film and the colored layers are of a color other than white and black and a black layer which are superposed in this order from the white substrate film side.

10. A double-sided pressure-sensitive adhesive tape affixed to a liquid-crystal display module unit, comprising the liquid-crystal display module unit and the double-sided pressure-sensitive adhesive tape comprising a pressure-sensitive adhesive layer disposed as an outermost layer on both sides of a substrate, wherein the substrate comprises colored layers comprising a white layer, a layer of a color other than white and black, and a black layer which are superposed in this order, and wherein the liquid-crystal display module unit is affixed to the double-sided pressure-sensitive adhesive tape.

11. The double-sided pressure sensitive adhesive tape of claim 10, wherein the layer of a color other than white and black is a silver layer.

* * * * *